(12) United States Patent
Walsh et al.

(10) Patent No.: US 10,859,284 B2
(45) Date of Patent: Dec. 8, 2020

(54) SOLID-STATE COMMON-WIRE ADAPTER FOR SMART COMMUNICATING THERMOSTATS

(71) Applicants: John Walsh, Bozeman, MT (US); Robert J. Mowris, Olympic Valley, CA (US)

(72) Inventors: John Walsh, Bozeman, MT (US); Robert J. Mowris, Olympic Valley, CA (US)

(*) Notice: Subject to any disclaimer, the term of this patent is extended or adjusted under 35 U.S.C. 154(b) by 0 days.

(21) Appl. No.: 16/409,805

(22) Filed: May 11, 2019

(65) Prior Publication Data
US 2019/0346163 A1 Nov. 14, 2019

Related U.S. Application Data

(60) Provisional application No. 62/670,134, filed on May 11, 2018.

(51) Int. Cl.
F24F 11/30 (2018.01)
F24D 19/10 (2006.01)
G05D 23/19 (2006.01)
F24F 11/88 (2018.01)
F24F 11/65 (2018.01)
G05B 15/02 (2006.01)
(Continued)

(52) U.S. Cl.
CPC .......... F24F 11/30 (2018.01); F24D 19/1084 (2013.01); F24F 11/58 (2018.01); F24F 11/65 (2018.01); F24F 11/88 (2018.01); G05B 15/02 (2013.01); G05D 23/1917 (2013.01); F24F 2110/10 (2018.01); F24F 2140/60 (2018.01); F24F 2221/54 (2013.01)

(58) Field of Classification Search
CPC .. F24F 11/30; F24F 11/88; F24F 11/65; F24F 11/58; F24F 2140/60; F24F 2110/10; F24F 2221/54; F24D 19/1084; G05B 15/02; G05D 23/1917
USPC ....................................................... 700/277
See application file for complete search history.

(56) References Cited

PUBLICATIONS

Venstar® Inc., Add-a-Wire™ Model ACC0410 Installation Instructions, https://venstar.com/thermostats/accessories/add-a-wire/, Date: Feb. 2012, pp. 4, Venstar® Inc., 9250 Owensmouth Ave, Chatsworth, CA 91311.

(Continued)

Primary Examiner — Robert E Fennema
Assistant Examiner — Christopher W Carter
(74) Attorney, Agent, or Firm — Kenneth L. Green; Averill & Green

(57) ABSTRACT

A solid-state common-wire adapter combines two Heating, Ventilating, Air Conditioning (HVAC) control signals on a single pre-existing wire to allow another pre-existing wire to be used as a common-wire to provide reliable power to a Smart Communicating Thermostat. The solid-state common-wire adapter may comprise a thermostat element with at least one diode and an HVAC element with at least one device selected from the group consisting of: a solid-state TRIode for Alternating Current (TRIAC), a capacitor, a microprocessor, a power supply, an optoisolator, and a load resistor. Smart Communicating Thermostats require continuous power for communicating with a wireless network, providing a Liquid Crystal Display (LCD) display, and controlling an HVAC system. Some Smart Communicating Thermostats use power stealing which is unreliable. The solid-state common-wire adapter is reliable, small, low-cost, and easy to install.

14 Claims, 6 Drawing Sheets

(51) Int. Cl.
*F24F 11/58* (2018.01)
*F24F 110/10* (2018.01)
*F24F 140/60* (2018.01)

(56) References Cited

PUBLICATIONS

Lux Products, Power Bridge Installation, https://www.luxproducts.com/wp-content/uploads/2017/10/20170628_Power-Bridge-Install-Sheet-V0-R13.pdf, Date: Jun. 30, 2017, pp. 2, Lux Products, 4747 S. Broad Street Building 101 Suite 330, Philadelphia, PA 19112.
Honeywell Inc., THP9045A1023/U WireSaver, a C-Wire Adapter for Wi-Fi thermostats or RedLINK 8000 series models, http://cache-m2.smarthome.com/manuals/300673.pdf, Date: Jul. 7, 1999, pp. 12, Honeywell Inc., 8008 Corporate Center Dr, Charlotte, NC 28226.
Ecobee Inc., EBPEK01 Smart SI Power Extender Kit, https://rexel-cdn.com/Products/Ecobee/EB-PEK-01.pdf?i=3B61CFCF-FE72-4BE4-A844-E0EAEB443A31, Date: Apr. 1, 2013, pp. 2, Ecobee, Inc., 207 Queens Quay West, Suite 600 Toronto, ON M5J 1A7.
Tai-Shing Electronics Components Corp., TRD (Part No. TRD-12VDC-SC-CL), https://www.promelec.ru/pdf/TRD.pdf, pp. 2, Sep. 16, 2006, Tai-Shing Electronic Components Corp, Inc., 3F, No. 5, Wou-Chuan 2nd Rd., WuGu District, New Taipei, Taiwan 24890.
Xiamen Hongfa Electro Acoustic Company, Ltd, HFD Subminiature Signal Relay, http://www.hongfa.com:8080/pdfjs/web/viewer.html?file=/Uploads/PDF/HFD23_en.pdf&stamp=1563246061276, pp. 3, Date: Aug. 7, 2018, Hongfa Electro Acoustic Company, Ltd, 3/F No. 560-578 Donglin Road, Jimei District, Xiamen, Fujian 361021, China Xiamen.
Carrier Corporation Inc., TS-2PE01 Power Extender Kit, http://9459a8a7c04856c345d2-4f8300507cf0a318260a6776e1a92a67.r99.cf1.rackcdn.com/IIK-TS2PE-01.pdf, Date: Oct. 28, 2014, pp. 2, Carrier Corporation, 7310 W Morris St, Indianapolis, IN 46231.

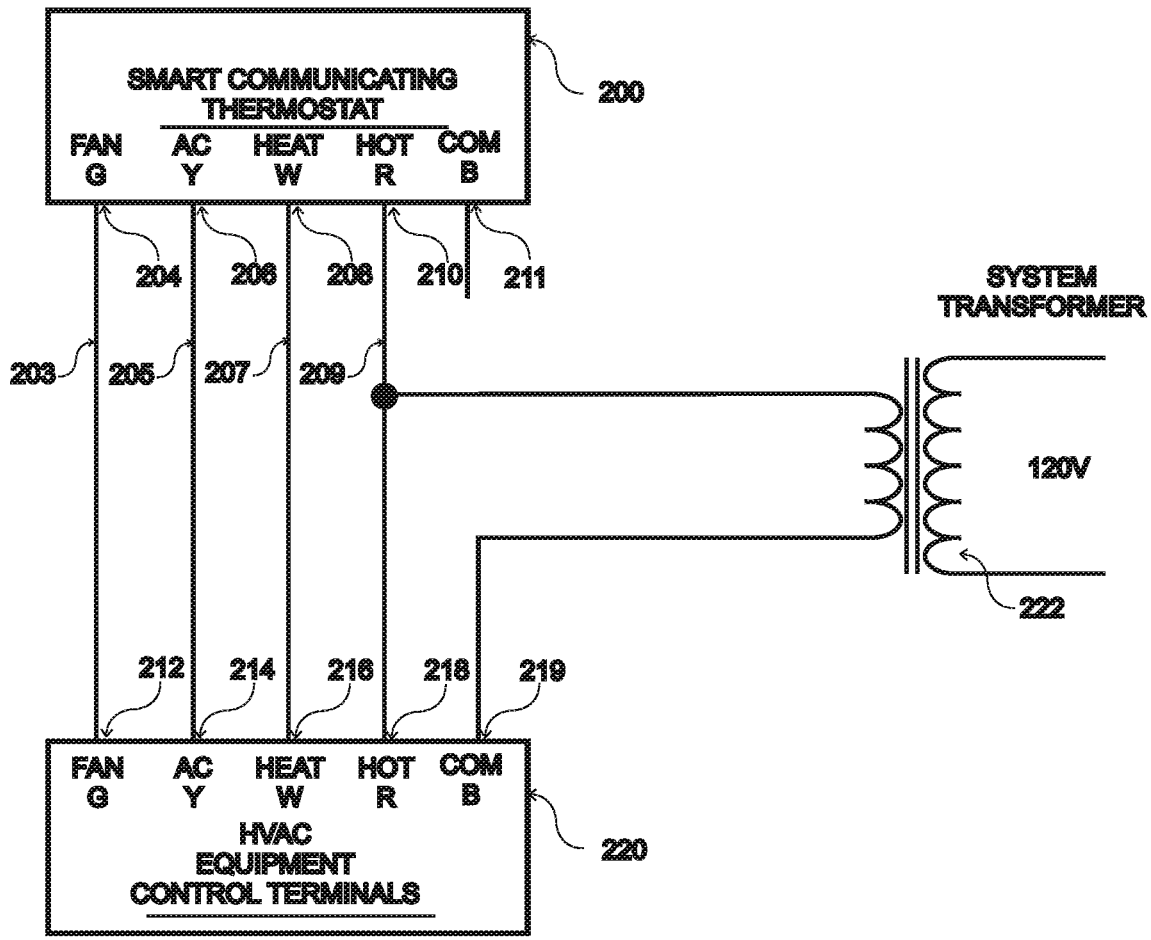

Note: Most pre-existing buildings do not provide a common wire at the thermostat. Prior art electro-mechanical products are available on the market to provide common wire functionality, but the prior art products are large and expensive costing $18 to $99 or 16 to 90% of the retail cost of Smart Communicating Thermostats. Therefore, an unresolved need exists for a low-cost product to meet this unresolved need.

FIG. 1

SOLID-STATE COMMON-WIRE ADAPTER FOR SMART COMMUNICATING THERMOSTATS

CROSS-REFERENCE TO RELATED APPLICATIONS

The present application claims the priority of U.S. Provisional Patent Application Ser. No. 61/324,229 filed Apr. 14, 2010, and is a Continuation In Part of U.S. patent application Ser. No. 13/085,119 filed Apr. 12, 2011, and is a Continuation In Part of U.S. patent application Ser. No. 13/427,542 filed Mar. 22, 2012, and is a Continuation In Part of U.S. patent application Ser. No. 14/168,503 filed Jan. 30, 2014, and is a Continuation In Part of U.S. patent application Ser. No. 15/144,806 filed May 2, 2016, and claims the priority of U.S. Provisional Patent Application Ser. No. 62/670,134 filed May 11, 2018, which applications are incorporated in their entirety herein by reference.

BACKGROUND OF THE INVENTION

Pre-existing conventional thermostats do not require a common wire, and pre-existing wiring harnesses often do not provide a common wire to provide reliable power for smart communicating thermostats used to control Heating, Ventilation, Air Conditioning (HVAC) systems.

Residential and commercial HVAC system power consumption in the United States accounts for 30% of average summer peak-day electricity loads, 14% of total electricity use, and 44% of total natural gas use, as reported by the US Energy Information Agency Residential and Commercial Energy Consumption Surveys from 2003 and 2009.

Prior art electro-mechanical devices are available in the market to provide a common wire at the thermostat, but these devices are large and expensive and can cost from $18 to $99 per unit which is 16 to 90% of the cost of a smart communicating thermostat. Due to the larger size and expense, smart communicating thermostat manufacturers are attempting to design around the problem of no common wire at the thermostat using power stealing, but this has caused numerous problems with loss of power and reliability causing smart communicating thermostats not to function properly.

Smart communicating thermostats must keep their batteries charged by drawing power through low-voltage wires connected to the Air Conditioning (AC) contactor, the gas valve, or the fan relay. This power stealing creates numerous problems for the HVAC system. First, the device from which the power is drawn can activate unintentionally or not activate. For example, the AC compressor can be turned on unintentionally when there is no call for cooling. The HVAC system can unintentionally activate a heating cycle, or the fan can come on when there is no call for the fan. During periods of high HVAC usage, such as very hot or very cold days, the battery can be drawn down during longer periods of heating or cooling. Since the heating or cooling cycle is frequent due to the outdoor temperature, the battery does not get a chance to re-charge and the HVAC system must shut down for a period of time until the battery charge is restored. This can cause building occupants to be uncomfortably hot with no AC during summer or cause building occupants to be uncomfortably cold with no heating during winter or cause water in a plumbing system to freeze causing water damage in the building.

Known gas furnace central heating systems are controlled by thermostats which energize a relay to turn on the gas furnace heat source with a brief delay followed by turning on the heater ventilation fan at a lower fan speed lower than the higher fan speed used for cooling. Maintaining a lower heater ventilation fan speed often results in increased heat soak within the central heating unit and the portion of the heat generated by the heat source not delivered to conditioned space is lost to the environment. The heat loss increases the central heating unit operational time consuming more energy. Further, the amount of heat soak increases as the central heating unit is operated for longer periods of time leaving significantly more unrecovered energy and higher temperatures (i.e., 260 to 470 degrees Fahrenheit) in the heat exchanger after the heater ventilation fan is turned off. In most heating systems a significant portion of this unrecovered heating energy is wasted and lost to the environment after the heat source and the heater ventilation fan are tuned off.

Known direct-expansion cooling systems are controlled by thermostats which turn on a cooling ventilation fan when the cool source is energized, and turn off the fan when the cool source is de-energized. When the cooling source is de-energized, there is a significant amount of cold water condensed onto the evaporator coil which is not used to deliver sensible cooling capacity to the conditioned space. This sensible cooling capacity is lost to the environment after the cool source and the cooling ventilation fan are tuned off. This increases the cooling system operational time and energy use.

Known heat pump, electric resistance, and hydronic heating systems are controlled by thermostats which turn on the ventilation fan when the heat source is energized and turn off the fan when the heat source is de-energized. Hydronic heating and cooling systems circulate a liquid from a central location to a heat exchanger in a Forced Air Unit (FAU). Known heat pump and hydronic systems do not provide a fan-on delay. Nor do heat pump and hydronic systems provide a heating fan-off time delay due to lower heat exchanger temperatures of 130 to 180 degrees Fahrenheit, which are 2 to 3 times lower than gas furnace heat exchanger temperatures. During the start-up period there is no useful heating delivered by the ventilation air which can waste fan energy and cause thermal comfort issues for building occupants. When the heat source is de-energized there is a significant amount of heating energy left in the heating coil which is not used to deliver heating capacity to the conditioned space, and this heating capacity is lost to the environment after the heat source and the heating ventilation fan are tuned off. The heat loss increases the heat pump, electric resistance, or hydronic heating system operational time and energy use.

A non-patent publication by Venstar Inc., describes an electro-mechanical Add-a-Wire™ product that costs from $21 to $99. In applications where additional wiring cannot be installed, the Add-A-Wire accessory can be used to add a wire to the thermostat. See https://venstar.com/thermostats/accessories/add-a-wire/.

A non-patent publication by Lux Products Corporation describes an electro-mechanical Power Bridge product that costs from $18 to $22. The LUX Power Bridge provides 24V AC power to thermostats in homes without C-wires. Thermostats that connect to WiFi networks and home automation systems like Amazon Alexa and Apple HomeKit need a consistent 24V AC power source for optimal performance. The LUX Power Bridge allows homes with 3 and 4 wire thermostats to reap the benefits of smart thermostats without requiring a new wire to be installed between the furnace and the thermostat. See https://pro.luxproducts.com/power-bridge/.

A non-patent publication by Honeywell International Inc., describes an electro-mechanical Wiresaver THP9045-A1023/U wiring module that costs $12 to $16 but only works with Honeywell thermostats and does not provide a connector at the thermostat for other manufacturers. The Honeywell WireSaver is a C-Wire Adapter for Wi-Fi thermostats or RedLINK 8000 series Honeywell thermostat models. See https://customer.honeywell.com/en-US/Pages/Product.aspx?cat=HonECC+Catalog&pid=thp9045a1023/U.

A non-patent publication by Ecobee Inc., describes an electro-mechanical EBPEK01 Smart SI Power Extender Kit that costs $20 to $27. A common wire is required for 5-wire thermostats. If there are only 4 wires to the existing thermostat (i.e. there is no common wire), the Ecobee Power Extender Kit can be used to power the Ecobee WIFI thermostat. See https://support.ecobee.com/hc/en-us/articles/227874107-Installing-the-Power-Extender-Kit-with-ecobee-Si-thermostats.

A non-patent publication by Tai-Shing Electronic Components Corp, Inc., 2006. "Power-TRD.pdf," www.tai-shing.com.tw, (p. 2) describes a mechanical relay (part number TRD-12 VDC-SC-CL) with a Life Expectancy of 100,000 operations used in the Venstar electro-mechanical Add-a-Wire™ product.

A non-patent publication by Xiamen Hongfa Electro Acoustic Company, Ltd, 2007. "HFD_en.pdf," www.hongfa.com, (p. 1) describes a mechanical relay (part number HFD-23) with a Life Expectancy of 100,000 operations ($10^5$) used in the Lux electro-mechanical Power Bridge product.

All prior art electro-mechanical products are expensive and some are designed for specific thermostats. Prior art electro-mechanical designs are expensive to manufacture due to the costs associated with the electro-mechanical relays, both in the cost of the physical part, and also in the cost associated with manufacturing costs to manually install through-hole relays on circuit boards during manufacturing. The physical size of the electro-mechanical relays also requires a package that will accommodate the size of two of these devices. This package adds to the cost of the overall solution. Prior art products do not provide a small, low-cost, and reliable solution to meet the unresolved need of providing a common wire and reliable power for smart communicating thermostats.

BRIEF SUMMARY OF THE INVENTION

The present invention solid-state common-wire adapter solves an unresolved need to provide a small, low cost, reliable, and easy to install product that repurposes an existing wiring harness and allows the addition of a "common wire" function where one previously did not exist at the thermostat location to provide reliable power to Smart Communicating Thermostats which need continuous power for an LED display and communication with a WIFI local area network.

The present invention provides increased reliability by using solid-state electronic devices that are not limited to a rated number of operations, reduced power draw on the system transformer, less waste heat for longer operation for the system transformer, and easier installation.

The present invention may include an embodiment of an Efficient Fan Controller (EFC) described in U.S. Pat. Nos. 8,763,920, 9,328,933, 9,500,386, 9,671,125, 9,797,405, 9,995,493, and U.S. patent application Ser. Nos. 13/085,119, 14/168,503, 15/251,978, 15/358,131, 13/427,542, and 15/144,806 incorporated in their entirety herein by reference. Adding the present invention to the these patents could substitute other switching devices for the triacs such as relays or FET transistors.

The present invention uses gate-sensitive TRIAC or FET devices to implement a solid-state switching element. The TRIAC has a measure life expectancy of 23,127,000 hours of continuous operation (i.e., 2,640 years). For HVAC applications, the switching element must often be located in a hot attic or rooftop. Rather than using a lifetime estimate based on an operating temperature of 77° F. (or 25° C.) nominal operating temperature, the lifetime estimate was reduced based on a higher operating temperature of 140° F. (or 60° C.). Based on 140° F. operating temperature and 5,760 hours of HVAC operation per year, the expected life of the TRIAC is to 4,015 years. TRIAC life expectancy is based on non-patent publication by Littlefuse, Inc. 2018. "Z01xxMNT1G Product Validation & Reliability Summary," for an electronic TRIAC.

Virtually all Smart Communicating Thermostats currently installed in buildings do not have a common wire, causing reliability problems. The present invention provides reliable and consistent power, customer comfort, and safety at a low cost. The common wire function is required in many buildings with pre-existing low-voltage 4-wire electrical harnesses in order to provide continuous and reliable power to Smart Communicating Thermostats that connect to the internet using a wireless Ethernet network officially referred to as the IEEE 802.11 standard.

The present invention uses a gate-sensitive TRIACs or FETs in conjunction with a simple charged capacitor and an internal load resistor across the output to transform a positively or a negatively rectified signal into a full AC waveform for controlling the HVAC system. Combining an onboard load resistor to ensure continuous gate-sensitive TRIAC operation regardless of HVAC input impedance, is not found in prior art regarding common wire adapters. TRIACS require triggering in at least 2 quadrants. To control an AC output, using a positive gate signal, the TRIAC must be triggered in quadrant 1 and quadrant 4. Quadrant 1 is when the gate is positive and the MT2 terminal is also positive. This case is when the AC input to the TRIAC (system transformer Hot 210 in FIGS. 1-5)) on MT2 is positive and the MT1 terminal is 0 VAC as is the case when the AC input has just passed 0 VAC. The forth quadrant is when the gate is positive and the MT2 terminal is negative. Quadrant 4 triggering is generally the most difficult quadrant to trigger. Using gate sensitive TRIACs allow the triggering obstacles to overcome. The innovative addition of an onboard load resistor ensures the TRIAC conducts current through the entire cycle regardless of the input impedance of the HVAC system.

The prior art does not provide a novel onboard load in parallel with the HVAC load. There are no known devices or prior art available that perform the same function with one or more TRIACS. There are no published techniques for adding onboard load resistors to the TRIAC outputs. Therefore, the present invention does not represent the use of a known technique to improve a similar device. There are no known devices ready for improvement to yield predictable results since the TRIAC, capacitor, and internal load resistors used in the present invention, are not obvious nor predicable based on prior art. This is not obvious to try because the results of using a TRIAC, capacitor, and load resistor do not involve choosing a number of identified, predictable solutions to support a TRIAC approach. The present invention is not predictable to one of ordinary skill in the art as evidenced by the fact that there are no products similar to the present invention currently available and currently available designs do not work on all HVAC applications. There are no published technical documents, teaching, suggestions or motivation in the prior art that would have led one of ordinary skill to modify the prior art reference or to combine a prior art reference teaching to arrive at the present invention solid-state common-wire adapter.

The main objects of the present invention are:

(1) to provide reliable and continuous power to Smart Communicating Thermostats using a small, low-cost, solid-state electronic apparatus that provides a common wire from the HVAC transformer to the thermostat using existing wiring; and (2) to eliminate the requirement to install a common wire through the walls of the building, minimizing any wiring modifications to satisfy power requirements for the Smart Communicating Thermostat.

The solid state common-wire adapter includes elements residing at the thermostat and at the HVAC. A thermostat element connects to the thermostat wiring at the thermostat, the HVAC element connects to the HVAC system at the terminal block. The thermostat element is comprised of a set of parallel diodes in reverse polarity with respect to each other. The anode of one diode connects to one of the control signals emanating from the thermostat. This signal could be the cooling (yellow wire), heating (white wire), or fan (green wire). This diode positively rectifies the signal from the thermostat. The cathode of the other diode connects to one of the above listed wires that has not been connected to the anode of the other diode. This diode negatively rectifies the thermostat signal. The other ends of the diodes not connected to the thermostat wires connect together and connect to one of the existing wires going from the thermostat to the HVAC equipment. Thus, a single wire can be used to convey four states of the thermostat wires. For example, if the anode of one diode is attached to the Yellow wire, and the cathode is attached to the Green wire, then the following Table 1 provides exemplary signal states (303b) of wire 303.

TABLE 1

Exemplary Electrical States of Wire 303

| Wire Electrical State | Signal Condition |
| --- | --- |
| Positive Rectified Waveform | Yellow Active, Cooling |
| Negative Rectified Waveform | Green Active, Fan Only |
| Complete Sinusoid Waveform | Yellow Active, Green Active |
| Floating (No Waveform) | Yellow Inactive, Green Inactive |

The HVAC element can detect each of the four states listed above. Once a particular active state is detected, the full sinusoid signal represented by a rectified signal on a single wire, is recreated and transmitted to the HVAC equipment. Given the above example, if the Yellow wire is used to send the rectified signals from the thermostat end to the HVAC end, the Green wire can be reconnected at the HVAC Element to the common side of the HVAC transformer and connected to the common side of the thermostat.

In accordance with another aspect of the invention, two diodes are connected to signals from thermostat terminals. One diode will positively rectify a 24 VAC signal from the thermostat, and the other will negatively rectify the 24 VAC signal. The outputs from the diodes are connected together to send a single signal conducted over a single wire to a microprocessor located at the furnace. The microprocessor receives the positively rectified, negatively rectified, or a full sinusoid signal The microprocessor monitors the output signal from the diodes and determine if the signal is positively rectified, negatively rectified, or a complete sinusoid. In this way, more than one signal can be transmitted to the invention using a single wire. This aspect of the invention allows the re-purposing of one of the wires in the wire bundle from the HVAC control terminals to the thermostat to be used to carry the common signal from the system transformer to the thermostat to provide power to the thermostat, when the common wire is not present in the bundle.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows the connections between a known Smart Communicating Thermostat and the HVAC Equipment Control Terminals with the common wire input of the thermostat unconnected.

Corresponding reference characters indicate corresponding components throughout the several views of the drawings.

LIST OF ELEMENTS

Figure 2:
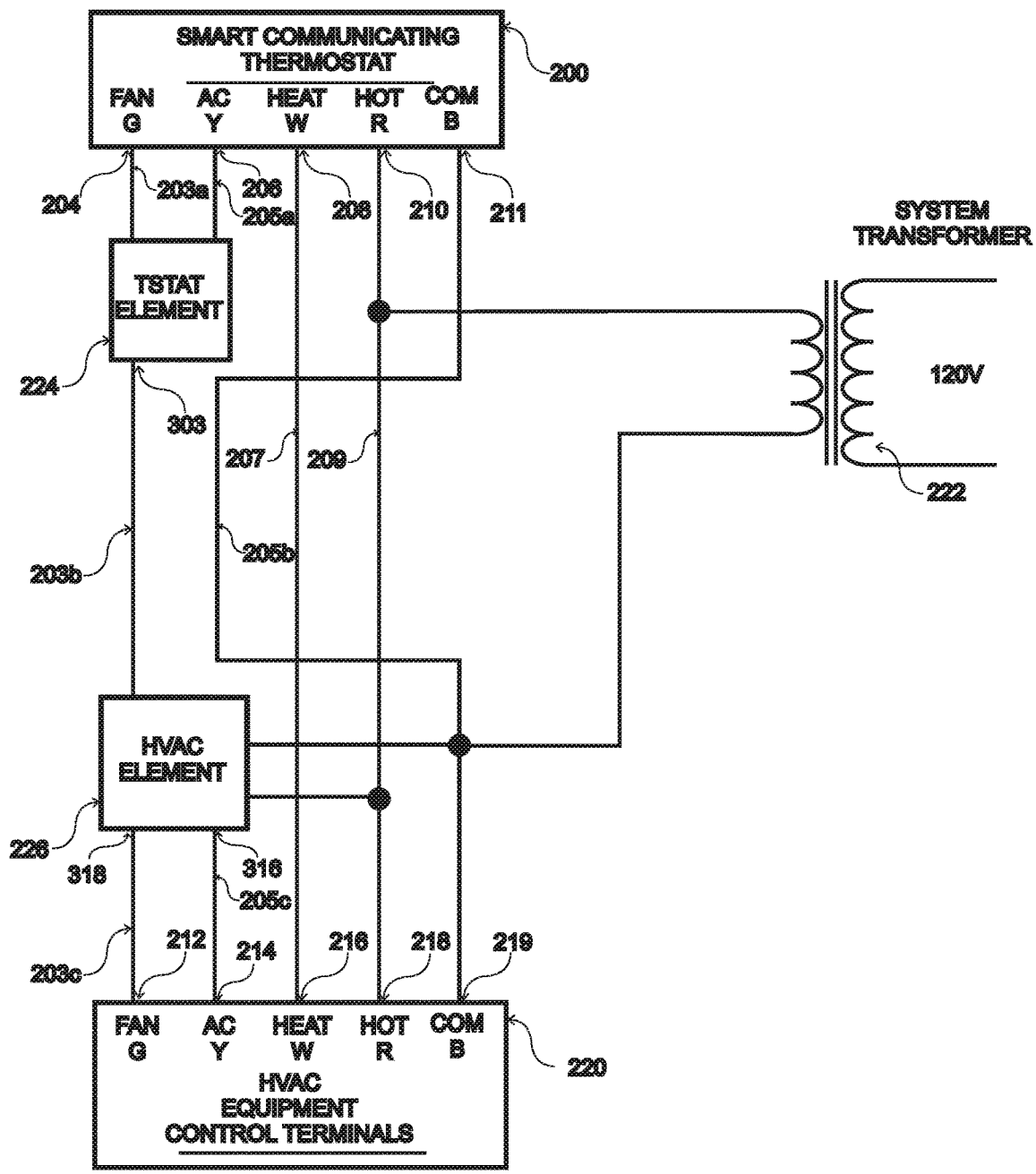
FIG. 2 shows the Thermostat Element of the present invention and the HVAC Element of the present invention freeing up an existing wire in the four wire harness to be used as a Common wire.

200—A Smart Communicating Thermostat
203—A wire connecting the thermostat Fan G output to the Fan G input of the HVAC Equipment Control Terminals
203a—A wire connecting the thermostat Fan G output to the Fan G input of the Tstat Element
203b—A re-purposed wire (either existing wire 203 or 205) connecting the Tstat Element output to the input of the HVAC element
203c—A wire connecting the HVAC Element FAN G output to the Fan G input of the HVAC Equipment Control Terminals
204—A Fan G output from the thermostat
205—A wire connecting the thermostat AC Y output to the AC Y input of the HVAC Equipment Control Terminals
205a—A wire connecting the thermostat AC Y output to the AC Y input of the Tstat Element
205b—A re-purposed wire (remaining wire not chosen for element 203b, either 203 or 205) connecting the Common terminal of the HVAC Equipment Terminals to the Common B terminal of the thermostat 205c—A wire connecting the HVAC Element AC Y output to the AC Y input of the HVAC Equipment Control Terminals 206—An AC Y output from the thermostat 207—A wire connecting the thermostat Heat W output to the Heat W input of the HVAC Equipment Control Terminals 208—A Heat W output from the thermostat 209—A wire connecting the thermostat Hot R input to the Hot R input of the HVAC Equipment Control Terminals and the System Transformer Hot R output 210—The Hot R lead from the system transformer 211—The Common B input to the thermostat 212—The Fan G input to the HVAC Equipment Control Terminals 214—The AC Y input to the HVAC Equipment Control Terminals 216—The Heat W input to the HVAC Equipment Control Terminals 218—The Hot R input to the HVAC Equipment Control Terminals 219—The Common B input to the HVAC Equipment Control Terminals 220—The HVAC Equipment Control Terminals 222—The System Transformer 224—The Thermostat Element of the present invention 226—The HVAC Element of the present invention may include an embodiment of an Efficient Fan Controller (EFC) to control a fan-off delay based on the duration of a heating cycle or the duration of a cooling cycle where the duration includes at least one duration selected from the group consisting of: a heating on time, a heating off time, a cooling on time, and a cooling off time.

228—The repurposed wire used to carry the common signal to the thermostat

230—The repurposed wire used to carry the positively or negatively rectified signals from the thermostat 300—Diode attached to a thermostat output 302—Diode attached to a thermostat output 303—The output from the Thermostat Element of the present invention 304—Diode for a positively rectified signal to charge a capacitor 305—Wire carrying a negative DC signal to trigger a triac 306—Diode for a negatively rectified signal to charge a capacitor 307—Wire carrying a positive DC signal to trigger a triac 308—Capacitor for holding a negative charge 312—Capacitor for holding a positive charge 316—Output from a triac 318—Output from a triac 320—Optoisolator used to signal a processor 322—A microprocessor 324—A power supply for the microprocessor circuits 326—A 5 volt output from the power supply 328—Triac 330—Triac 332—An output from the power supply synchronous to the 60 Hz input 334—An output from the optoisolator 336—A pull up resistor 338—An output from the microprocessor to trigger a triac 340—An output from the microprocessor to trigger a triac

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

FIG. 1 shows prior art thermostat wiring when only 4 wires are available in the wiring harness. This case is prevalent in existing buildings which were built before Smart Communicating Thermostats were available. Most thermostats prior to Smart Communicating Thermostats simply connected the Hot R terminal 210 to the appropriate output based on whether the thermostat was set for heating or cooling. For cooling, the standard thermostat connects the Hot R terminal 210 to both the Fan G terminal 204 and the AC Y terminal 206. This activates the compressor and the system fan. For heating, the thermostat connects the Hot R terminal 210 to the Heat W 208 terminal. With four wires 203, 305, 207, and 209, a standard thermostat can control the HVAC system to heat or cool a building. Smart Communicating Thermostats generally require an additional wire to bring a Common 219 signal to the thermostat Com B input 211. Without the fifth wire included in the original thermostat wiring harness, a solution is required to use one of the existing four wires 203, 305, 207, and 209 to carry two signals and free one of the other wires to supply the transformer 222 common wire to the thermostat Com B 211 input.

FIG. 2 shows a solid state common-wire adapter Thermostat Element 224 and HVAC Element 226 according to the present invention used to create a common signal path with only four wires between the thermostat 200 and HVAC equipment 220. The HVAC Element 226 may include an embodiment of an Efficient Fan Controller (EFC) to control a fan-off delay based on the duration of a heating or the duration of a cooling cycle where the duration includes at least one duration selected from the group consisting of: a heating on time, a heating off time, a cooling on time, and a cooling off time. The Smart Communicating Thermostat 200 has, for example, a wire 203a connected to the Fan G terminal 204 and a wire 205a connected to the AC Y terminal 206 carrying signals to the Thermostat Element 224. A re-purposed green wire 203b (a new use of wire 203) comes out of the Thermostat Element 224. The re-purposed wire 203b can be either the yellow wire 205 originally connected between the AC Y terminals 206 and 214, or the green wire 203 connected between the Fan G terminals 204 and 212, both shown in FIG. 1. FIG. 2 shows the re-purposed green wire 203b carrying signals originating from both the AC Y terminal 206 and the Fan G terminal 204. With two signals now on the re-purposed green wire 203b, the re-purposed yellow wire 205b is available to be reconnected at the HVAC Equipment Terminals 220 to the Com B terminal 219. The Re-purposed yellow wire 205b now has a new function to carry the Common signal from the HVAC Equipment Control Terminals Com B to the Smart Communicating Thermostat Com B input. At the Smart Communicating Thermostat, the yellow wire 205b is connected to the Com B terminal 211. The output of the Thermostat Element 224 goes to the input of the HVAC Element 226 through the re-purposed green wire 203b. The function of the HVAC Element 226 is to reproduce the signals routed through the Thermostat Element 224 to the HVAC Equipment Control Terminals 220 with full fidelity.

Figure 3:
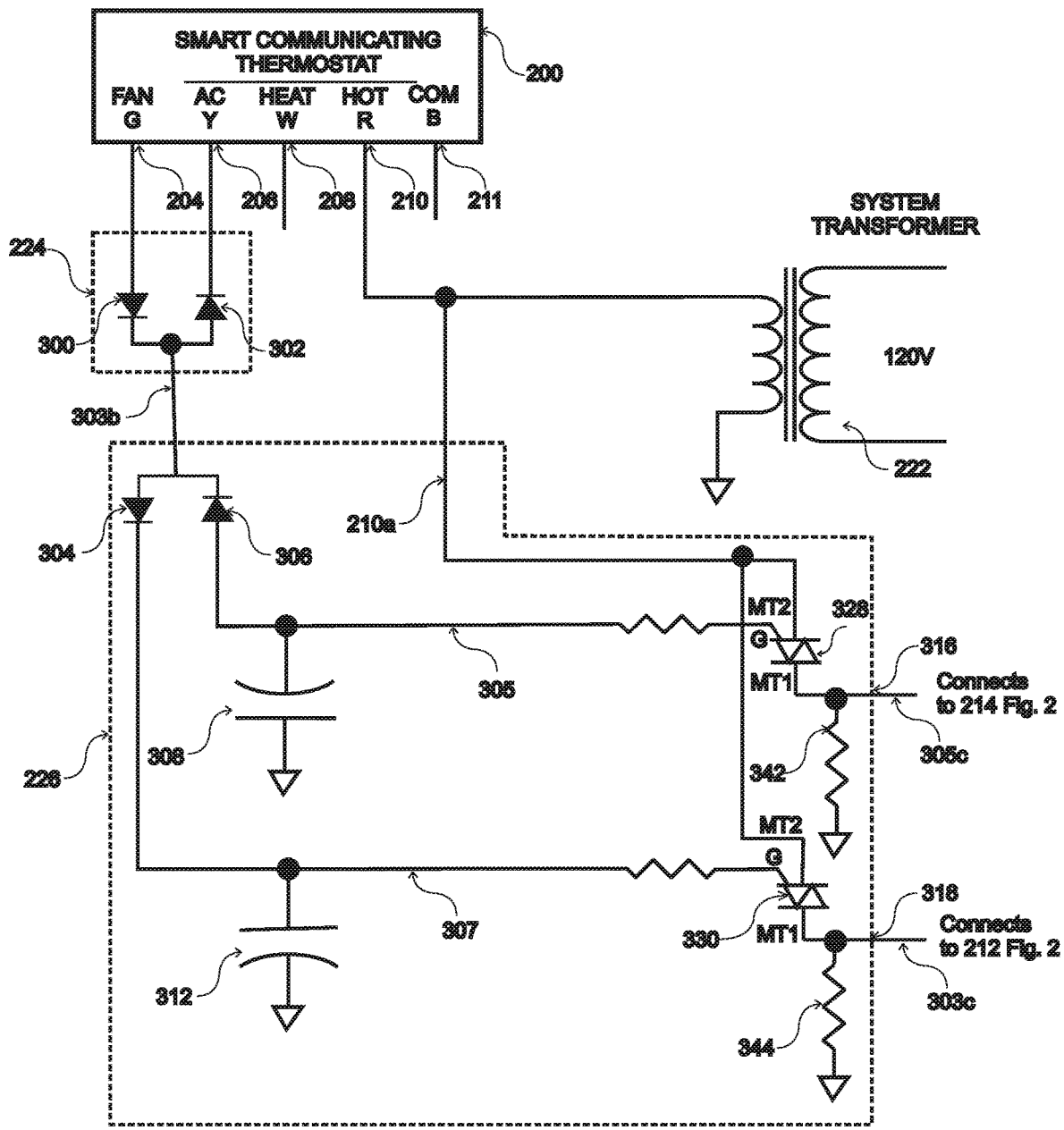
FIG. 3 shows one embodiment of the present invention using triacs to take a positively or negatively rectified signal and recreate a full AC waveform on two independent outputs.

FIG. 3 shows a circuit to implement the invention. Two diodes 300 and 302 are connected to the Smart Communicating Thermostat 200 Fan G 204 and the AC Y 206 terminals. The anode of diode 300 is attached to the Fan G 204 terminal. The cathode of diode 302 is attached to the AC Y 206 terminal. The invention does not limit which output terminal of the Smart Communicating Thermostat 204, 206, or 208 is attached to the diodes 300, 302. This discussion merely shows Fan G 204 and AC Y 206 as examples and the diodes 300, 302 may be attached to any two of the three thermostat terminal 204, 206, and 208. Also, the invention does not limit which output terminal is attached to the anode or cathode of which diode. The only restriction is that the diodes must be attached to the thermostat outputs in opposing polarity. One anode of one of the diodes is connected to one terminal, and the cathode of the other diode is connected to another thermostat output terminal. In this way, the output signal on the wire 204b from the Smart Communicating Thermostat Element 224 will carry either a positively rectified AC waveform through diode 300, a negatively rectified waveform through diode 302, or a full AC waveform if both the diodes are conduction in the case where both thermostat outputs are active simultaneously.

The output wire 303 from the Thermostat Element 224 goes to the input of the HVAC Element 226 as shown in FIG. 2 and to diodes 304 and 306. The wire 303 from the Thermostat Element 224 to the HVAC Element 226 conducts an HVAC signal 303b shown in FIG. 3 and FIG. 4." Diode 304 cooperates with diode 300 to provide a current path for a positively rectified signal from the Fan G 204 terminal. The positively rectified signal charges capacitor 312 and produced a DC voltage 307 that is used to trigger the gate sensitive triac 330 in at least two quadrants of the triac operation. Since the triac 330 is gate sensitive, it will trigger in at least two quadrants with a positive signal on the gate. When triac 330 is triggered, it passes a signal 210a on the Hot R 210 terminal to the output 318 (see FIG. 2) for the full AC waveform. Output 318 is passed to the HVAC Equipment Control Terminals Fan G 212 input (see FIG. 2). Thus, a positively rectified signal received by the HVAC Element 226 is transformed into a full AC waveform and signals to the HVAC Equipment Fan G terminal 212 that the thermostat Fan G 204 is active.

In the same way, diode 306 cooperates with diode 302 to provide a path for a negatively rectified signal from the Smart Communicating Thermostat 200 to charge a negative voltage on capacitor 308. This negative voltage is used to trigger the gate sensitive triac 328. The triac 328 is also connected to the thermostat Hot R 210 terminal and the system transformer 222. The gate sensitive triac 328 triggers with a negative voltage on the gate in at least two quadrants. When triggered, the triac 328 conducts a full AC waveform to the triac output 316. The triac output 316 is connected to the HVAC AC Y 214 terminal and signals that the thermostat AC Y terminal 206 is active.

Figure 4:
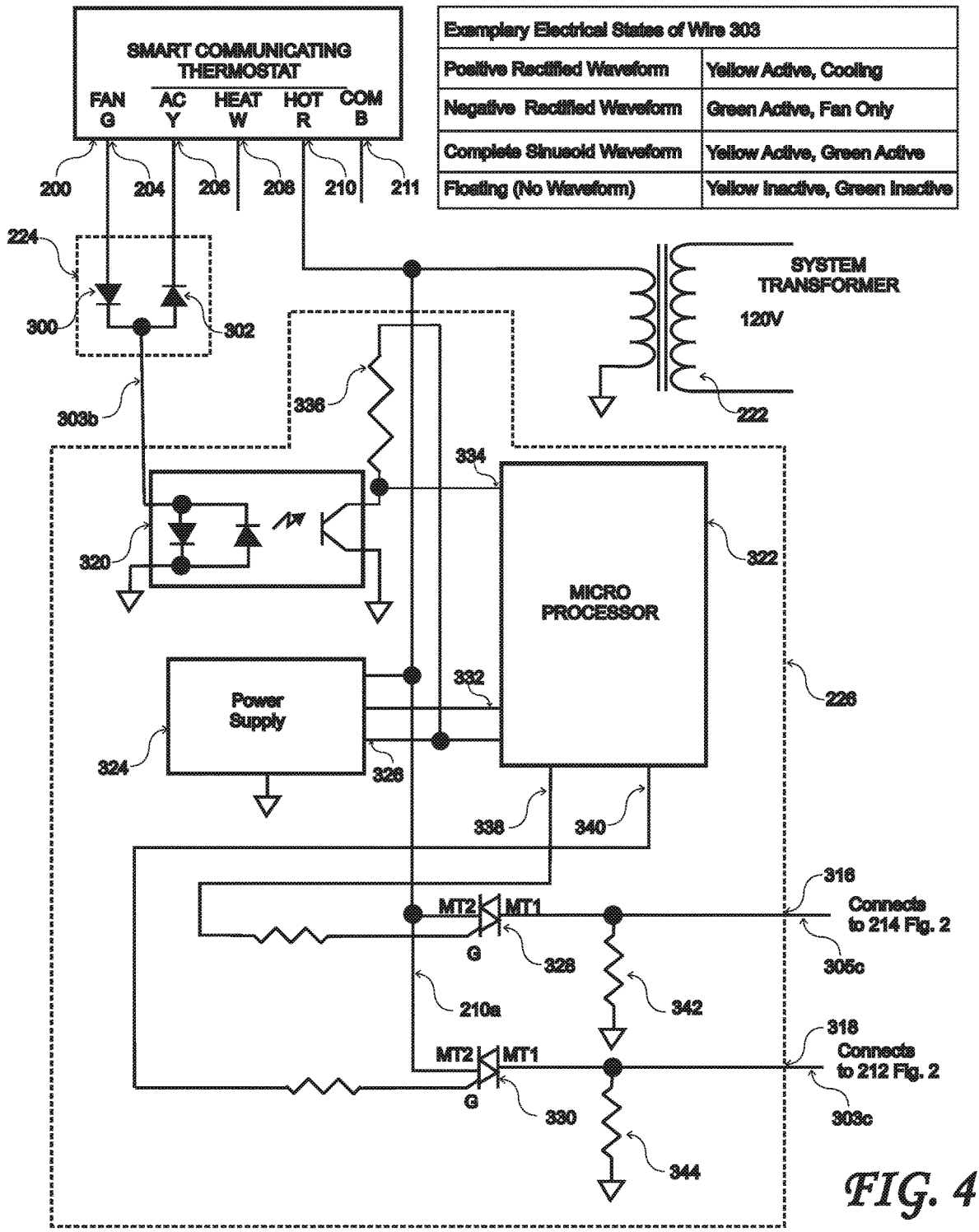
FIG. 4 shows another embodiment of the present invention using optoisolators and a microprocessor to trigger the triacs to create a full AC waveform from a positively or negatively rectified input signal.

FIG. 4 shows another embodiment of the solid state common-wire adapter using a microprocessor 322 and an optoisolator 320 to create the signals to trigger the triacs 328 and 330 outlined in the FIG. 3 discussion. This embodiment also uses a simple power which can be a switching or linear power supply 324 to provide a 5 volt signal 326 to the microprocessor 322 and the pull up resistor 336. The power supply 324 also provides a timing signal 332 that signals to the microprocessor 322 which is synchronous with the rising edge and falling edge of the 60 Hz input from the system transformer 222. The signal 332 is used by the microprocessor 322 to determine when to look at the output 334 of the optoisolator 320. The output 334 of the optoisolator 320 will be a zero if the input signal on the wire 303 is positively or negatively rectified. The microprocessor 322 samples the input 332 from the power supply 324 for a positive edge of the 60 Hz input and then samples the output 334 of the optoisolator 320. If the output 334 from the optoisolator 320 is zero after a rising edge of the 60 Hz input 332, then the processor 322 activates output 340 to trigger the triac 330 which passes the signal from Hot R 210 to the output 318 which signals to the HVAC Equipment Control Terminals 220 that the Fan G input 212 is active. The microprocessor 322 again triggers the triac 330 at the crossing of the input 332 from a positive level to a zero level, indicating a crossing of the 60 Hz signal from a positive voltage to a negative voltage. In this way the triac 330 is continuously triggered to provide a continuous AC waveform for output 318.

In the same way, the output 334 from the optoisolator 320 is zero with a negatively rectified input on the wire 203b. The microprocessor 322 samples the input 332 from the power supply and monitors for a transition from a positive input to a zero input. This transition indicates that the Hot R 210 signal has changed from a positive voltage level to a negative voltage level. The microprocessor then monitors the output 334 from the optoisolator 320. If the voltage is zero at this transition, then the optoisolator 320 is receiving a negatively rectified signal from the input on the wire 203b. Receiving a zero on input 334 indicates to the microprocessor 322 that a negatively rectified input is being received and the processor triggers triac 328 with a gate signal 338 which causes the Hot R 210 signal to be transmitted to the triac output 316. The microprocessor 322 also triggers the triac 328 on positive transitions of the power supply 324 output 332 to force the triac to conduct a full AC waveform to the triac output 316.

Figure 5:
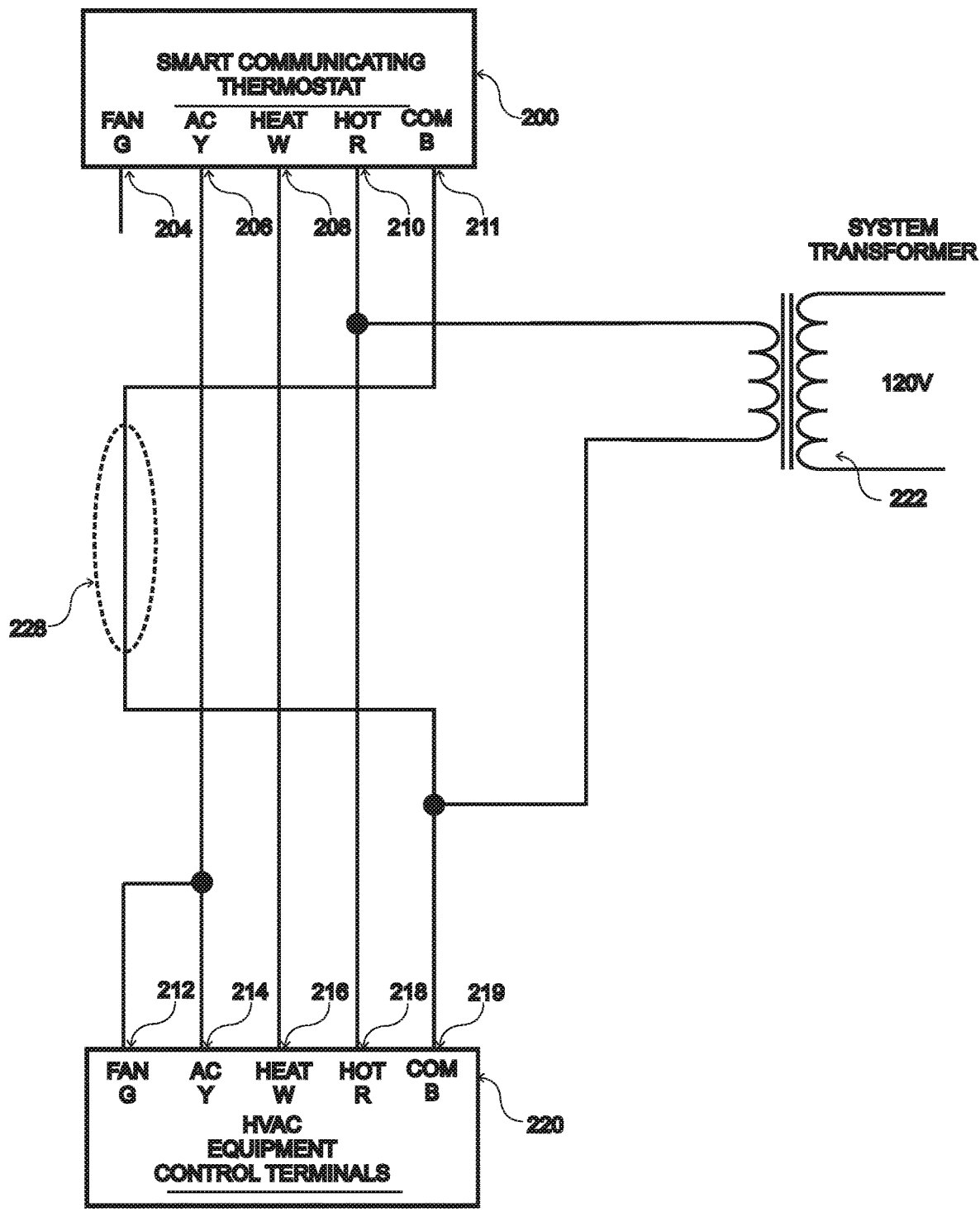
FIG. 5 show a method of the present invention using the Fan G signal to provide common wire functionality.

FIG. 5 shows a method of using the Fan G wire to provide the Common wire functionality to the Smart Communicating Thermostat 200. This method eliminates the thermostat "Fan On" function, and the fan will no longer be able to be operated alone without the heating or cooling function, but has the advantage of using an existing wiring harness with no additional hardware required. The AC Y signal 206 from the Smart Communicating Thermostat 200 maintains the connection from the Smart Communicating Thermostat 200 to the HVAC Equipment Control Terminals 220 but the Fan G wire in the harness is disconnected from the Fan G 204 terminal at the thermostat 200 and the Fan G terminal 212 at the HVAC Equipment Control Terminals 220. The wire is then repurposed as shown by dashed oval 228 to carry the Com B signal 219 to the Com B terminal 211. An additional connection is made at the HVAC Equipment Control Terminals 220 between the AC Y input 214 and the Fan G input 212 to operate the system fan any time the AC Y input 214 signal is active.

The embodiment of FIG. 3 and FIG. 4 may include an embodiment of an efficient fan controller described in U.S. Pat. Nos. 8,763,920, 9,328,933, 9,500,386, 9,671,125, and 9,797,405 and U.S. patent application Ser. Nos. 13/085,119, 14/168,503, 15/251,978, and 15/358,131. Adding the present invention to the these patents could substitute other switching devices for the triacs, such as relays or FET transistors.

Figure 6:
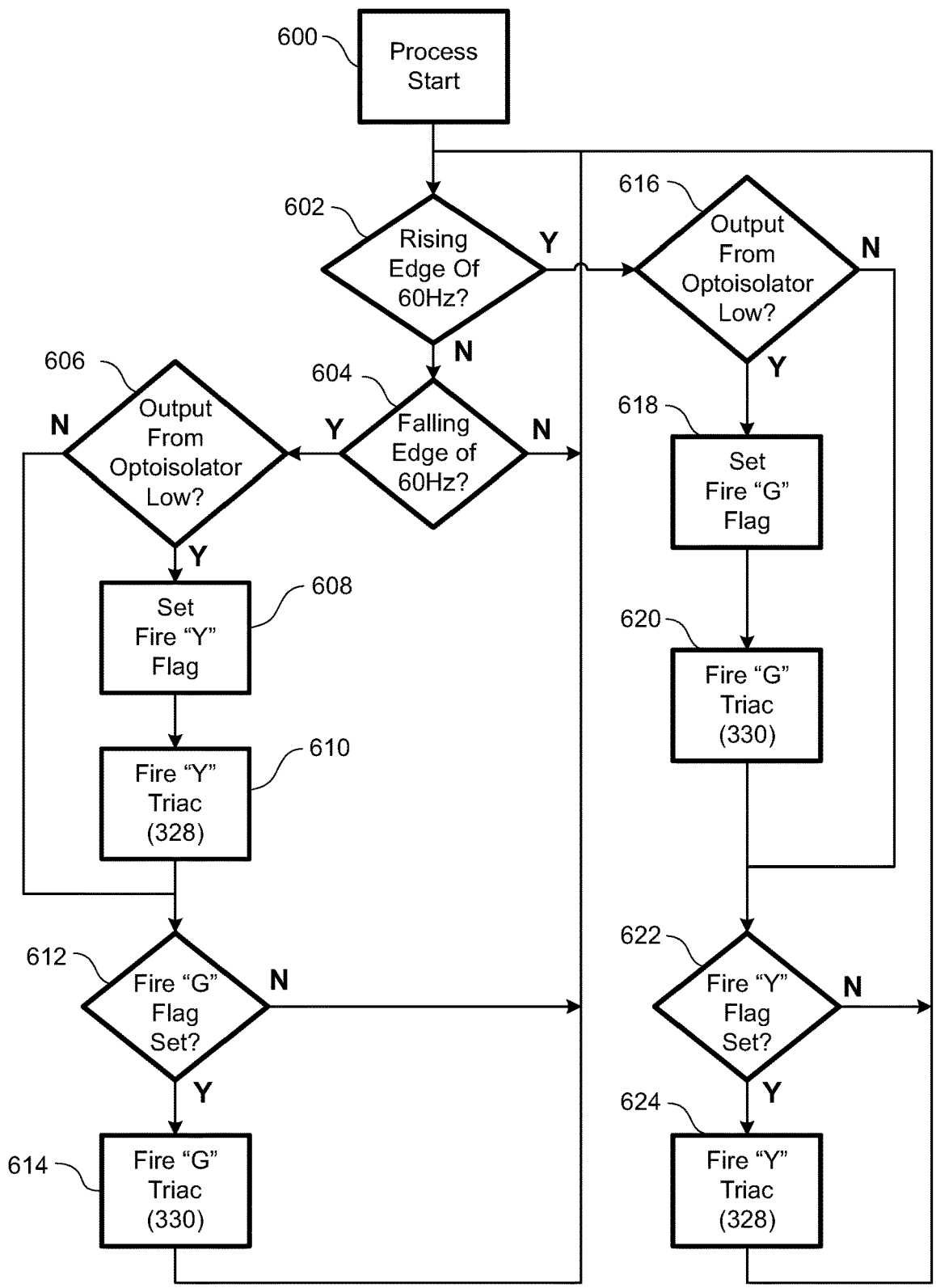
FIG. 6 shows a flow chart for implementing the method of this application within a microprocessor.

FIG. 6 shows how a microprocessor would process the signals from the power supply 324 and optoisolator 320 shown in FIG. 4. Step 600 is the reset point of the software. Step 602 determines if the signal 332 from the power supply 324 has transitioned from a 0 to a 1, indicating a rising edge of the 24 VAC signal from the system transformer 222 in FIG. 4. If the signal does not indicate a transition from a 0 to a 1, then at step 604 the same signal 332 is examined to determine if it has transitioned from a 1 to a 0, indicating a falling edge of the 24 VAC signal from the system transformer. In 602, if there has been a rising edge detected, flow proceeds to step 616 where the microprocessor 322 examines the output 334 from the optoisolator 320 to determine if it is low, or 0. If positively rectified current is flowing from the smart communicating thermostat Fan (G) 204 terminal, through diode 300 into the optoisolator 320, the output from the optoisolator 320 will be low. If no current is flowing, then the output of the optoisolator 320 will be high. In 616, if the output from the optoisolator 320 is low, indicating that the thermostat 200 is calling for the fan to be ON, the process flows to step 618 where the Fire "G" flag is set indicating that the FAN G terminal 204 is active. In box 620, the microprocessor 322 outputs a signal 340 to the TRIAC 330 which in turn passes a positively rectified half wave signal to the HVAC Equipment FAN G terminal 212 which turns on the system fan. In step 622, the microprocessor 322 examines the Fire Y flag which may be set in step 608 based on the signal on the thermostat 200 AC Y terminal. If the Fire "Y" flag is set, in step 624 the microprocessor also outputs a control signal 338 to TRIAC 328 which in turn passes a positively rectified half wave signal to the HVAC Equipment Terminal 214 which turns on the system AC Compressor. If the Fire Y flag is not set, the process loops back to step 602 and continues to look for a positive (step 602) or negative transition (step 604) of the 24 VAC input.

If step 604 detects a negative transition on the power supply 324 output 332 then flow proceeds to step 606 when the output from the optoisolator 320 is examined. If the output from the optoisolator is low, then in step 608, the microprocessor 322 sets the Fire "Y" flag and then in step 610 the microprocessor sends a signal 338 to TRIAC 328 which in turn passes a negatively rectified half wave signal to the HVAC Equipment AC Y Terminal 214 which turns on the system AC Compressor. Step 624 and step 610 fire TRIAC 328 in both positive and negative AC cycles and thus turn a half-wave rectified signal from the thermostat AC Y output into a full AC waveform provided to the HVAC Equipment Terminal AC Y 214. In step 612, the microprocessor 322 examines the Fire "G" flag to determine if it was set in step 620. If the Fire "G" flag was set, then the microprocessor 322 sends a signal 340 to TRIAC 330 which in turn passes a negatively rectified half wave signal to the HVAC Equipment FAN G terminal 212 which turns on the system fan. The use of step 622 and step 614 fire TRIAC 318 in both positive and negative AC cycles and thus turn a half-wave rectified signal from the thermostat Fan G output into a full AC waveform provided to the HVAC Equipment FAN G terminal 212.

While the invention herein disclosed has been described by means of specific embodiments and applications thereof, numerous modifications and variations could be made thereto by those skilled in the art without departing from the scope of the invention set forth in the claims.

We claim:

1. A solid-state common-wire adapter apparatus, the apparatus comprising:
   a Thermostat Element comprising:
      a first electrical input terminal connected to an anode of a first diode to positively rectify an input signal from a first HVAC control signal from a thermostat,
      a second electrical input terminal connected to a cathode of a second diode to negatively rectify an input signal from a second HVAC control signal from a thermostat,
      an electrical output terminal connected to a cathode of the first diode and an anode of the second diode to provide the electrical output terminal with an HVAC control signal, and
      an electrical connection between the Thermostat Element and a HVAC Element to carry the HVAC control signal;
   the HVAC Element comprising:
      a first electrical input terminal to receive the HVAC control signal from the Thermostat Element,
      a second electrical input terminal to receive a 24 VAC hot (R) signal from a system transformer,
      a third electrical input terminal to receive a 24 VAC neutral (B) signal from the system transformer,
      an optional fourth electrical input terminal to receive a Heat (W) HVAC control signal from the Thermostat,
      a first switching device connected to a first electrical output terminal to connect to a Fan (G) terminal on a HVAC Equipment terminal,
      a second switching device connected to a second electrical output terminal to connect to at least one HVAC Equipment terminal selected from the group consisting of: an AC Compressor (Y) terminal, and a Heat (W) terminal,
      a power supply configured to supply DC current to the HVAC element and a 5 volt AC signal to a microprocessor synchronous with the 24 VAC Hot (R) signal,
      an optoisolator connected to the first electrical input terminal of the HVAC Element, and
      a microprocessor;
      wherein the microprocessor is configured to perform at least one action selected from the group consisting of:
         monitor an output signal from a power supply and an output signal from the optoisolator to provide a signal to the first switching device to provide a first continuous AC waveform to the first electrical output to energize the Fan (G) terminal if the control signal input has a positively rectified signal and provide a signal to the second switching device to provide a second continuous AC waveform to the second output to energize at least one HVAC Equipment terminal selected from the group consisting of: the AC Compressor (Y) terminal, and the Heat (W) terminal, if the control signal input has a negatively rectified signal,
         monitor a duration of a cooling cycle and determine a variable fan-off delay time based on the duration of the cooling cycle, and at an end of the cooling cycle, either energize or continue to energize the first electrical output connected to the Fan (G) terminal to operate a system fan/blower for the variable fan-off delay time to deliver additional cooling energy to a conditioned space wherein the variable fan-off delay time is determined in order to improve energy efficiency, and
         monitor a duration of a heating cycle and determine the variable fan-off delay time based on the duration of the heating cycle, and at an end of a heating cycle, either energize or continue to energize a fan relay signal output to operate the system fan/blower for the variable fan-off delay time to deliver additional heating energy to the conditioned space wherein the variable fan-off delay time is determined in order to improve the energy efficiency;

wherein the first electrical input terminal is connected to an input terminal of an optoisolator and the output of the optoisolator is connected to a microprocessor and the microprocessor is also connected to the power supply for power and the power supply also provides a waveform to the microprocessor that coincides to transitions of the waveform of a 24 VAC input power from above neutral to below neutral and the microprocessor has two outputs connected to a gate of a first TRIAC and a second TRIAC and a first input of the first TRIAC is connected to the system transformer hot (R) and the optoisolator in concert with the first diode in the Thermostat Element to provide a current path for the positively rectified HVAC control signal to send a low signal to the microprocessor to trigger the first TRIAC in at least two quadrants of operation to pass an unrectified first HVAC control signal as a first full 24 VAC waveform Fan (G) HVAC control signal to the first electrical output terminal to operate the system/fan blower; and wherein the optoisolator works with the second diode in the Thermostat Element to provide a current path for the negatively rectified HVAC control signal to send a low signal to the microprocessor to trigger the second TRIAC in at least two quadrants of operation to pass the unrectified second HVAC control signal as a second full 24 VAC waveform HVAC control signal to the second electrical output terminal and control at least one HVAC device selected from the group consisting of: an AC compressor, and a heating system.

2. The solid-state common-wire adapter apparatus of claim 1, wherein the optoisolator and the power supply provide inputs to the microprocessor; and the microprocessor is configured to provide gate signals to the first TRIAC and the second TRIAC.

3. The solid-state common-wire adapter apparatus of claim 1, wherein when the microprocessor receives a +5 volt waveform from the third electrical input terminal from the 24 VAC hot (R) signal from a system transformer with a frequency of 60 Hz; the waveform is selected from a group consisting of: +5 volts when the 24 VAC signal is in a positive state, and 0 volts when the 24 VAC signal is in a negative state, and +5 volts when the 24 VAC signal is in a negative state, and 0 volts when the 24 VAC signal is in a positive state.

4. The solid-state common-wire adapter apparatus of claim 1, wherein the microprocessor examines the output from the optoisolator when the waveform from the power supply indicates the 24 VAC signal input has changed from the negative state to the positive state and if the input from the optoisolator is low, sends a gate signal to the first TRIAC at all positive and negative transitions of the power supply signal input until the input signal from the optoisolator is high when the power supply signal input has changed from the negative state to the positive state.

5. The solid-state common-wire adapter apparatus of claim 1, wherein the microprocessor examines the output from the optoisolator when the waveform from the power supply indicates the 24 VAC input has transitioned from the positive state to the negative state and if the input from the optoisolator is low, sends a gate signal to the second TRIAC at all positive and negative transitions of the of the power supply signal until the input signal from the optoisolator is high when the power supply signal input has transitioned from the positive state to the negative state.

6. The solid-state common-wire adapter apparatus of claim 1, wherein when a positively rectified HVAC control signal is received on the first electrical input, the microprocessor gates the first TRIAC in at least 2 quadrants causing the first TRIAC to trigger and pass the unrectified HVAC control signal as the first full 24 VAC waveform HVAC control signal to the first electrical output terminal and control at least one HVAC device selected from the group consisting of: a fan, the AC compressor, and the heating system.

7. The solid-state common-wire adapter apparatus of claim 1, wherein when a negatively rectified second HVAC control signal is received on the first electrical input, the microprocessor gates the second TRIAC causing the second TRIAC to trigger and pass the unrectified second HVAC control signal as the second full 24 VAC waveform HVAC control signal to the second electrical output terminal and control at least one HVAC device selected from the group consisting of: a fan, the AC compressor, and the heating system.

8. The solid-state common-wire adapter apparatus of claim 1, wherein the HVAC element microprocessor is configured to perform at least one action from the group consisting of:
monitor the duration of the heating cycle and determine an amount of time a fan operation is extended after the heating cycle based on the duration of the heating cycle wherein the duration of the heating cycle includes at least one duration selected from the group consisting of: a heating on time and a heating off time; and
monitor the duration of the cooling cycle and determine the amount of time the fan operation is extended after the cooling cycle based on the duration of the cooling cycle wherein the duration of the cooling cycle includes at least one duration selected from the group consisting of: a cooling on time and a cooling off time.

9. The solid-state common-wire adapter apparatus of claim 1, wherein a first onboard load resistor and a second onboard load resistor draw sufficient current from the first and second output terminals to ensure the first TRIAC and the second TRIAC remain in a conduction state when connected to a high input impedance HVAC terminal.

10. A solid-state common-wire adapter apparatus, the apparatus comprising:
a Thermostat Element comprising:
a first electrical input terminal connected to an anode of a first diode to positively rectify an input signal from a HVAC control signal from a thermostat,
a second electrical input terminal connected to a cathode of a second diode to negatively rectify an input signal from a second HVAC control signal from a thermostat, and
an electrical output terminal connected to a cathode of the first diode and an anode of the second diode to provide the electrical output terminal with a HVAC control signal;
a HVAC Element comprising:
a first electrical input terminal to receive the HVAC control signal from the Thermostat Element,
a second electrical input terminal to receive a 24 VAC hot (R) signal from a system transformer,
a third electrical input terminal to receive a 24 VAC neutral (B) signal from the system transformer,
a fourth optional electrical input terminal to receive a Heat (W) HVAC control signal from the Thermostat, a first switching device connected to a first electrical output terminal to connect to a Fan (G) terminal on a HVAC Equipment terminal,
a second switching device connected to a second electrical output terminal to connect to at least one HVAC Equipment terminal selected from the group consisting of: an Air Conditioning (AC) compressor (Y) terminal, and a Heat (W) terminal,
a power supply configured to supply DC current to the HVAC element and a 5 volt AC signal to a microprocessor synchronous with the 24 VAC Hot (R) signal,
an optoisolator connected to the first electrical input terminal of the HVAC Element, and
a microprocessor; and
wherein the microprocessor is configured to monitor an output signal from the power supply and an output signal from the optoisolator to provide a signal to the first switching device to provide a first continuous AC waveform to the first electrical output to energize the Fan (G) terminal if the control signal input has a positively rectified signal and provide a signal to the second switching device to provide a second continuous AC waveform to the second output to energize at least one HVAC Equipment terminal selected from the group consisting of: the AC Compressor (Y) terminal, and the Heat (W) terminal, if the control signal input has a negatively rectified signal.

11. The solid-state common-wire adapter apparatus of claim 10, wherein the HVAC element microprocessor is configured to perform at least one action from the group consisting of:
monitor a duration of a heating cycle and determine an amount of time a fan operation is extended after the heating cycle based on the duration of the heating cycle wherein the duration of the heating cycle includes at least one duration selected from the group consisting of: a heating on time and a heating off time; and
monitor a duration of a cooling cycle and determine the amount of time the fan operation is extended after the cooling cycle based on the duration of the cooling cycle wherein the duration of the cooling cycle includes at least one duration selected from the group consisting of: a cooling on time and a cooling off time.

12. The solid-state common-wire adapter apparatus of claim 10, wherein the first switching device is a first TRIAC and the second switching device is a second TRIAC wherein the first TRIAC is connected to the first electrical output terminal and the second TRIAC is connected to the second electrical output terminal, and a first onboard load resistor and a second onboard load resistor draw sufficient current from the first output terminal and the second output terminal to ensure the first TRIAC and the second TRIAC remain in a conduction state when connected to a high input impedance HVAC terminal.

13. A solid-state common-wire adapter apparatus, the apparatus comprising:
a Thermostat Element comprising:
a first electrical input terminal connected to an anode of a first diode to positively rectify an input signal from a HVAC control signal from a thermostat,
a second electrical input terminal connected to a cathode of a second diode to negatively rectify an input signal from a second HVAC control signal from a thermostat,
an electrical output terminal connected to a cathode of the first diode and an anode of the second diode to provide the electrical output terminal with a positively rectified HVAC control signal and a negatively rectified second HVAC control signal, and
an electrical connection between the Thermostat Element and a HVAC Element to carry the positively rectified HVAC control signal and the negatively rectified second HVAC control signal;
the HVAC Element comprising:
a first electrical input terminal to receive the positively rectified HVAC control signal and the negatively rectified second HVAC control signal from the Thermostat Element,
a second electrical input terminal to receive a 24 VAC hot (R) signal from a system transformer,
a third electrical input terminal to receive a 24 VAC neutral (B) signal from the system transformer,
a first switching device connected to a first electrical output terminal to connect to at least one HVAC Equipment terminal selected from the group consisting of: a Fan (G) terminal, an Air Conditioning (AC) compressor (Y) terminal, and a Heat (W) terminal, and
a second switching device connected to a second electrical output terminal to connect to at least one HVAC Equipment terminal selected from the group consisting of: a Fan (G) terminal, an Air Conditioning (AC) compressor (Y) terminal, and a Heat (W) terminal;
wherein the first electrical input terminal is connected to an anode of a third diode and a cathode of a fourth diode and a cathode of the third diode is connected to a positive side of a first capacitor and a negative side of the first capacitor is connected to the system transformer neutral (B) and the positive side of the first capacitor connects to an input of a first resistor and the output of the first resistor connects to a gate of a first TRIAC and a first input of the first TRIAC is connected to the system transformer hot (R) and the third diode acts in concert with the first diode in the Thermostat Element to provide a current path for the positively rectified HVAC control signal to charge the first capacitor to produce a DC voltage to trigger the first TRIAC in at least two quadrants of operation to pass an unrectified HVAC control signal as a first full 24 VAC waveform HVAC control signal to the first electrical output terminal and control at least one HVAC device selected from the group consisting of: a fan, an AC compressor, and a heating system; and
wherein the first electrical input terminal is also connected to a cathode of the fourth diode and an anode of the fourth diode is connected to a negative side of a second capacitor and a positive side of the second capacitor is connected to the system transformer neutral (B) and the negative side of the second capacitor connects to an input of a second resistor and the output of the second resistor connects to a gate of a second TRIAC and a first input of the second TRIAC is connected to the system transformer hot (R) and the fourth diode acts in concert with the second diode in the Thermostat Element to provide a current path for the negatively rectified second HVAC control signal to charge the second capacitor to produce a DC voltage to trigger the second TRIAC in at least two quadrants of operation to pass the unrectified second HVAC control signal as a second full 24 VAC waveform HVAC control signal to the second electrical output terminal and control at least one HVAC device selected from the group consisting of: the fan, the AC compressor, and the heating system.

14. The solid-state common-wire adapter apparatus of claim 13, wherein first onboard load resistor and a second onboard load resistor draw sufficient current from the first and second output terminals to ensure the first TRIAC and the second TRIAC remain in a conduction state when connected to a high input impedance HVAC terminal.

* * * * *